(12) United States Patent
Srinivasan et al.

(10) Patent No.: US 7,337,163 B1
(45) Date of Patent: Feb. 26, 2008

(54) MULTIDIMENSIONAL DATABASE QUERY SPLITTING

(75) Inventors: Ranganathan Srinivasan, San Jose, CA (US); Abhijeet Kataria, Sunnyvale, CA (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 526 days.

(21) Appl. No.: 10/729,279

(22) Filed: Dec. 4, 2003

(51) Int. Cl.
*G06F 17/30* (2006.01)
(52) U.S. Cl. ............ 707/3; 707/1; 707/2; 707/10; 707/102; 707/104.1
(58) Field of Classification Search ............ None
See application file for complete search history.

(56) References Cited

U.S. PATENT DOCUMENTS

| | | | |
|---|---|---|---|
| 4,817,036 A * | 3/1989 | Millett et al. ............ 707/1 |
| 5,752,016 A * | 5/1998 | Whittaker et al. .......... 707/3 |
| 6,003,029 A * | 12/1999 | Agrawal et al. ........... 707/7 |
| 6,003,036 A * | 12/1999 | Martin .................. 707/102 |
| 6,009,432 A * | 12/1999 | Tarin ..................... 707/10 |
| 6,101,556 A * | 8/2000 | Piskiel et al. ............ 719/313 |
| 6,317,750 B1 * | 11/2001 | Tortolani et al. ........ 707/103 R |
| 6,492,989 B1 * | 12/2002 | Wilkinson ............... 345/440 |
| 6,564,212 B2 * | 5/2003 | Koskas ................... 707/3 |
| 6,931,391 B2 * | 8/2005 | Tang et al. ............... 707/2 |
| 6,944,818 B2 * | 9/2005 | Newman et al. ........... 715/517 |
| 6,947,929 B2 * | 9/2005 | Bruce et al. .............. 707/5 |
| 2001/0047372 A1 * | 11/2001 | Gorelik et al. ............ 707/514 |
| 2002/0029207 A1 * | 3/2002 | Bakalash et al. ........... 707/1 |

OTHER PUBLICATIONS

Y. Zhou et al. "Disk allocation methods for parallelizing grid files", IEEE, Proceedings of the 10th International Conference on Data Engineering, 1994, pp. 243-252. Available online at http://ieeexplore.ieee.org/xpls/abs_all.jsp?arnumber=283037.*
F.T. Leighton. "Introduction to Parallel Algorithms and Architectures: Arrays, Trees, Hypercubes", Morgan Kauffman Pub, 1992.*
W.-M. Chen, G.-H. Chen, F. Hsu, "Combinatorial Properties of Mesh of Trees," ispan, p. 134, 2000 International Symposium on Parallel Architectures, Algorithms and Networks (ISPAN '00), 2000.*

(Continued)

*Primary Examiner*—Jeffrey Gaffin
*Assistant Examiner*—Mark Andrew X Radtke
(74) *Attorney, Agent, or Firm*—Hickman Palermo Truong & Becker LLP

(57) ABSTRACT

A multi-dimensional database query to be sent to a data source may be split into multiple smaller queries by a mid-tier solution and sent individually to the data source(s) for calculation and retrieval of data. This may be accomplished by creating row and column tree structures representing title and header rows and header columns in the query grid. The operation to be performed by the query may then be performed on these tree structures. The grid may then be split based on the resulting tree structures, and forwarded independently to one or more data servers. The results may be merged to generate the complete result or cursored. This allows the system to pass multiple smaller grids to data servers.

42 Claims, 22 Drawing Sheets

OTHER PUBLICATIONS

Warkhede, P.; Suri, S.; Varghese, G., "Fast packet classification for two-dimensional conflict-free filters," INFOCOM 2001. Twentieth Annual Joint Conference of the IEEE Computer and Communications Societies. Proceedings. IEEE, vol. 3, No. pp. 1434-1443 vol. 3, 2001 URL: http://ieeexplore.ieee.org/iel5/7321/19795/00916639.pdf?is number=19795∏=STD&arnum.*

Nievergelt, J., Hinterberger, H., and Sevcik, K. C. 1984. The Grid File: An Adaptable, Symmetric Multikey File Structure, ACM Trans. Database Syst. 9, 1 (Mar. 1984). 38-71. DOI= http://doi.acm.org/10.1145/348.318586.*

Lee, D. T. and Wong, C. K. 1980. Quintary trees: a file structure for multidimensional datbase sytems. ACM Trans. Database Syst. 5, 3 (Sep. 1980), 339-353. DOI= http://doi.acm.org/10.1145/320613.320618.*

Bentley, J. L. 1975. Multidimensional binary search trees used for associative searching. Commun. ACM 18, 9 (Sep. 1975), 509-517. DOI= http://doi.acm.org/10.1145/361002.361007.*

Edwards, R. Oct. 2005. Technology Audit, Business Intelligence, Hyperion System 9. Butler Group Subscription Services.*

Umeshwar Dayal: Of Nests and Trees: A Unified Approach to Processing Queries That Contain Nested Subqueries, Aggregates, and Quantifiers. VLDB 1987: 197-208.*

Chaudhuri, S. and Dayal. U. 1997. An overview of data warehousing and OLAP technology. SIGMOD Rec. 26, 1 (Mar. 1997), 65-74. DOI= http://doi.acm.org/10.1145/248603.248616.*

* cited by examiner

| | 100-10 | California | Sales | Actual |
|---|---|---|---|---|
| Qtr1 | xxxx | | | |

FIG. 2

|  | California | Sales | Actual |  |
|---|---|---|---|---|
|  | 100-10 | 100-20 | 100-30 | 200-20 |
| Qtr1 | xxxx | xxxx | xxxx | xxxx |

FIG. 3

|  |  | Sales |  |  |  |
|---|---|---|---|---|---|
|  |  | Actual |  | Budget |  |
|  |  | Jan | Dec | Feb | Mar |
| 100-10 | Market | xxxx | xxxx | xxxx | xxxx |

| (blank cell) | (blank cell) | Measures | East |
|---|---|---|---|
| (blank cell) | (blank cell) | Actual | Budget |

FIG. 7

| 100 | Qtr1 | | |
|---|---|---|---|
| | Qtr2 | | |
| | Qtr3 | | |
| 200 | Qtr1 | | |
| | Qtr2 | | |

| 200 | Qtr3 | | |
|---|---|---|---|
| 300 | Qtr1 | | |
| | Qtr2 | | |
| | Qtr3 | | |
| 400 | Qtr1 | | |

| 400 | Qtr2 | | |
|---|---|---|---|
| | Qtr3 | | |
| Diet | Qtr1 | | |
| | Qtr2 | | |
| | Qtr3 | | |

FIG. 8

|       | California | Sales  | Actual |        |
|-------|------------|--------|--------|--------|
|       | 100-10     | 100-20 | 100-30 | 200-30 |
| Qtr1  | xxxx       | xxxx   | xxxx   | xxxx   |
| Qtr2  | xxxx       | xxxx   | xxxx   | xxxx   |
| Qtr3  | xxxx       | xxxx   | xxxx   | xxxx   |

|      | California | Sales  | Actual |        |
|------|------------|--------|--------|--------|
|      | 100-10     | 100-20 | 100-30 | 200-30 |
| Qtr1 | xxxx       | xxxx   | xxxx   | xxxx   |
| Qtr2 | xxxx       | xxxx   | xxxx   | xxxx   |
| Qtr3 | xxxx       | xxxx   | xxxx   | xxxx   |

|       | California | Sales  | Actual |        |
|-------|------------|--------|--------|--------|
|       | 100-10     | 100-20 | 100-30 | 200-30 |
| Qtr1  | xxxx       | xxxx   | xxxx   | xxxx   |
| Qtr2  | xxxx       | xxxx   | xxxx   | xxxx   |
| Qtr3  | xxxx       | xxxx   | xxxx   | xxxx   |

|       | California | Sales  | Actual |        |
|-------|------------|--------|--------|--------|
|       | 100-10     | 100-20 | 100-30 | 200-30 |
| Qtr1  | xxxx       | xxxx   | xxxx   | xxxx   |
| Qtr2  | xxxx       | xxxx   | xxxx   | xxxx   |
| Qtr3  | xxxx       | xxxx   | xxxx   | xxxx   |

|  |  | Measures | East |
|---|---|---|---|
|  |  | Actual | Budget |
| 100 | Qtr1 |  |  |
|  | Qtr2 |  |  |
|  | Qtr3 |  |  |
| 200 | Qtr1 |  |  |
|  | Qtr2 |  |  |

|  |  | Measures | East |
|---|---|---|---|
|  |  | Actual | Budget |
| 200 | Qtr3 |  |  |
| 300 | Qtr1 |  |  |
|  | Qtr2 |  |  |
|  | Qtr3 |  |  |
| 400 | Qtr1 |  |  |

|  |  | Measures | East |
|---|---|---|---|
|  |  | Actual | Budget |
| 400 | Qtr2 |  |  |
|  | Qtr3 |  |  |
| Diet | Qtr1 |  |  |
|  | Qtr2 |  |  |
|  | Qtr3 |  |  |

FIG. 13

|  |  | Measures | East |
|---|---|---|---|
|  |  | Actual | Budget |
| 100 | Qtr1 | xxxx | xxxx |
|  | Qtr2 | xxxx | xxxx |
|  | Qtr3 | xxxx | xxxx |
| 200 | Qtr1 | xxxx | xxxx |
|  | Qtr2 | xxxx | xxxx |

|  |  | Measures | East |
|---|---|---|---|
|  |  | Actual | Budget |
| 200 | Qtr3 | xxxx | xxxx |
| 300 | Qtr1 | xxxx | xxxx |
|  | Qtr2 | xxxx | xxxx |
|  | Qtr3 | xxxx | xxxx |
| 400 | Qtr1 | xxxx | xxxx |

|  |  | Measures | East |
|---|---|---|---|
|  |  | Actual | Budget |
| 100 | Qtr1 | xxxx | xxxx |
|  | Qtr2 | xxxx | xxxx |
|  | Qtr3 | xxxx | xxxx |
| 200 | Qtr1 | xxxx | xxxx |
|  | Qtr2 | xxxx | xxxx |
| 200 | Qtr3 | xxxx | xxxx |
| 300 | Qtr1 | xxxx | xxxx |
|  | Qtr2 | xxxx | xxxx |
|  | Qtr3 | xxxx | xxxx |
| 400 | Qtr1 | xxxx | xxxx |

FIG. 14

MULTIDIMENSIONAL DATABASE QUERY SPLITTING

FIELD OF THE INVENTION

The present invention relates to the field of computer databases. More specifically, the present invention relates to the splitting of a multidimensional database query.

BACKGROUND OF THE INVENTION

Database applications are commonly used to store large amounts of data. Modern databases often also track metadata, or data about the data, to further improve storage capabilities and searchability. Users may access the databases for a variety of different uses, but one popular use is to generate reports based on the data and metadata in a database.

Online Analytical Processing (OLAP) involves the use of computers to extract useful trends and correlations from large databases of raw data. It may involve consolidating and summarizing huge databases containing millions of items (e.g., sales figures from all branches of a supermarket chain) and making this data viewable along multidimensional axes, while allowing the variables of interest to be changed at will in an interactive fashion. As such, the processing and memory load on OLAP servers is very high.

FIG. 1 is a diagram illustrating a typical OLAP architecture. Here, one or more OLAP servers 100 may receiver queries from users 102 via an application program interface (API) 104, generally associated with what is called a thick spreadsheet add-in (a program that sits atop a spreadsheet program). The term "thick" implies that the add-in is relatively large, such as one that requires a lot of overhead, as opposed to a "thin" add-in which uses minimal overhead. The add-in may utilize the user-interface of the spreadsheet to receive a data query and/or identification of metadata 106 from the user 102. It may then process this query and issue its own query 108 to an appropriate OLAP server. This query 108 is typically in the form of a complete grid of all metadata the user was able to view, along with an indication of actions the user wishes to take on the metadata (e.g., "drill-down").

There are, however, several drawbacks to this approach. First, grids of all available metadata can often be quite large. Typically users will not need all that information. For example, most systems only allow a limited amount of data to be displayed on the screen at once. While the processing power required on the user's side to handle such large grids may be adequate, the OLAP server must process many of these grids per second, slowing down its operation. Additionally, since these grids are often quite large, they can take up a significant portion of memory. It would therefore be more beneficial if there was a way to limit the query 108 to only the most vital information.

Second, current OLAP servers function in a session environment. This means that the user begins a session with the OLAP server (via the API) and that particular OLAP server continues to serve the user until the session is terminated. With multiple queries coming in from multiple users, it can become quite common for one OLAP server to be overloaded while others have available resources. While load balancing can be performed between OLAP servers, past solutions have all required the OLAP server to make this determination. For example, an OLAP server that is overloaded might check to see if it can find other OLAP servers to whom to pass off some work. This determination, however, merely uses up valuable processing power in the OLAP server. Additionally, those solutions require that the entire grid be passed to the initial OLAP server, creating the memory problem described above. What is needed is a solution that allows for load balancing without requiring additional processing power or memory from the OLAP server.

Third, many users may not wish to use up valuable processing power on their machine to support a thick spreadsheet add-in. What is needed is a solution that utilizes thin spreadsheet add-ins.

BRIEF DESCRIPTION

A multi-dimensional database query to be sent to a data source may be split into multiple smaller queries by a mid-tier solution and sent individually to the data source(s) for calculation and retrieval of data. This may be accomplished by creating row and column tree structures representing title and header rows and header columns in the query grid. The operation to be performed by the query may then be performed on these tree structures. The grid may then be split based on the resulting tree structures, and forwarded independently to one or more data servers. The results may be merged to generate the complete result or cursored. This allows the system to pass multiple smaller grids to data servers.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 2 is a diagram illustrating an example of a 2 cell by 5 cell grid with a title row and a header column in accordance with an embodiment of the present invention.

FIG. 3 is a diagram illustrating an example of a 3 cell by 5 cell grid with a title row, a header row, and a header column in accordance with an embodiment of the present invention.

FIG. 7 is a diagram illustrating an example of a header row grid in accordance with an embodiment of the present invention.

FIG. 8 is a diagram illustrating an example of split grids in accordance with an embodiment of the present invention.

FIG. 13 is a diagram illustrating an example of completed split grids in accordance with an embodiment of the present invention.

FIG. 14 is a diagram illustrating an example of merging resultant grids in accordance with an embodiment of the present invention.

DETAILED DESCRIPTION

Figure 1:
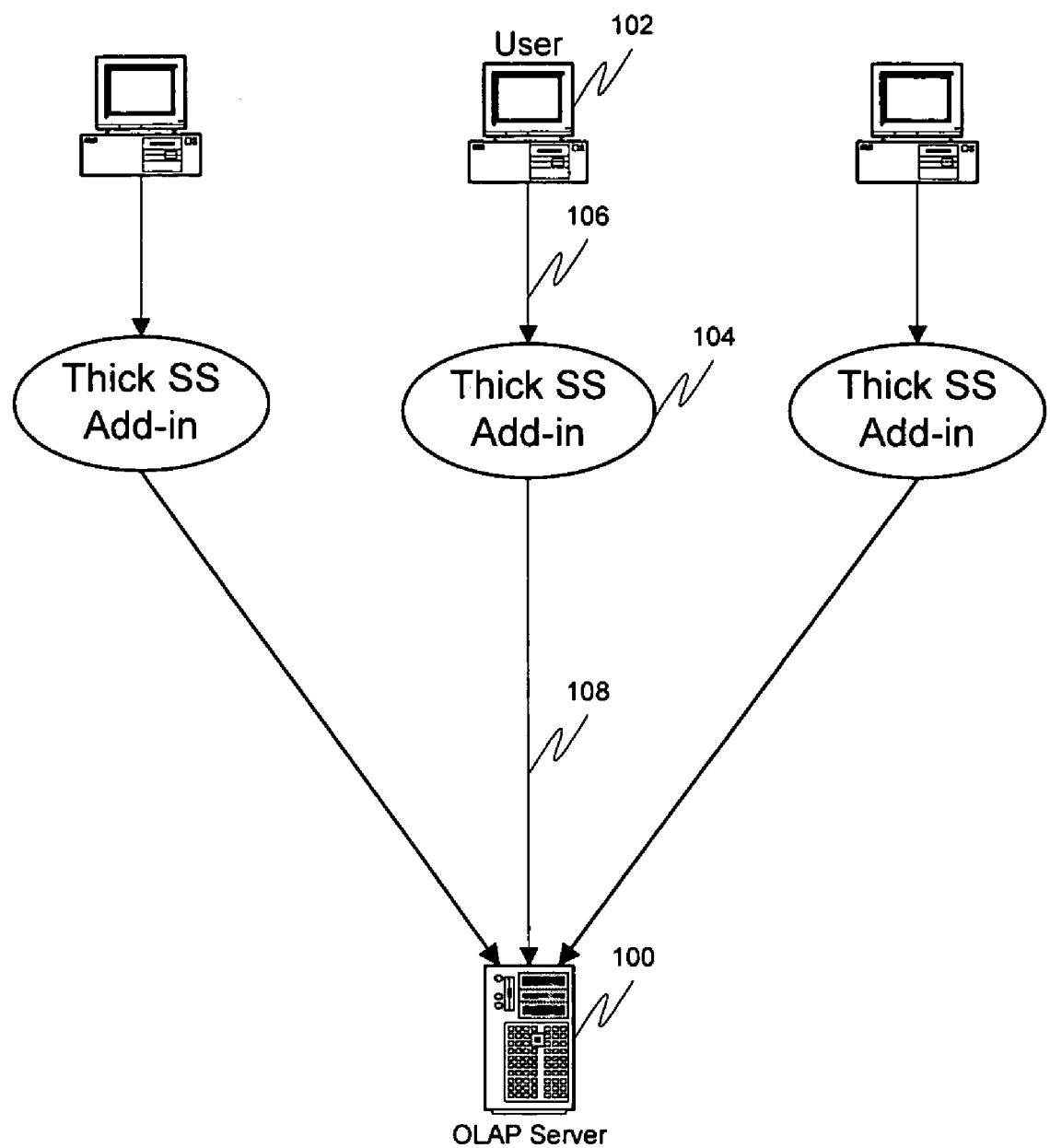
FIG. 1 is a diagram illustrating a typical OLAP architecture.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In an embodiment of the present invention, a multidimensional database query to be sent to a data source may be split into multiple smaller queries by a mid-tier solution and sent individually to the data source(s) for calculation and retrieval of data. The results may be merged to generate the complete result. This allows the system to pass multiple smaller grids to OLAP servers. The presence of the mid-tier solution also allows for extensive load balancing, as well as providing the opportunity to replace thick spreadsheet add-ins on users' computers with thin spreadsheet add-ins.

The multidimensional data, which is the input data for the query, is typically represented in a two-dimensional structure comprising multiple rows and columns. This is referred to as a grid. While this document will discuss the present invention in terms of a two-dimensional data structure, one of ordinary skill in the art will recognize that multidimensional data could be represented in "grids" of more than two dimensions, and the claims should not be read as being limited to only two-dimensional implementations.

Each node in the grid is referred to as a cell. This cell-based structure may represent both multidimensional metadata and data values. The top row of the grid can optionally be a slicer row representing members of the slicer axis for the data. This is called a title row. It can have members from more than one dimension. There could be multiple rows after that having members from different dimensions of the multidimensional database, but each row should have members from a single dimension only. This set of rows may be referred to as header rows of the data. Similarly, there may be one or more columns having members from different dimensions in the header columns. These columns may also have the condition that the members in one column are from a single dimension only. It is possible to have two successive columns representing the same members in a dimension such that one of the columns has alias names and other actual member names. If that is the case, then this convention is generally followed for all the header columns. Member names can repeat in header columns for better readability. In order for the grid to be valid, one dimension can only occur once (either in the title row or one of the header rows or columns).

One of ordinary skill in the art will recognize that the input may also be received as a language rather than a grid. In such cases, the present invention may be modified to first convert this language into grid format. For purposes of this document, this may be assumed to be included in "receiving the input grid".

Figure 2:
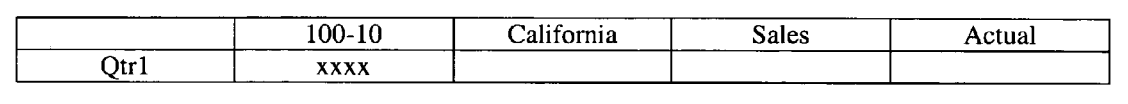

FIG. 2 is a diagram illustrating an example of a 2 cell by 5 cell grid with a title row and a header column in accordance with an embodiment of the present invention. The title row 200 contains members "10-100" 202, "California" 204, "Sales" 206, and "Actual" 208. The header column 210 contains member "Qtr1" 212. XXXX 214 indicates a data cell.

FIG. 3 is a diagram illustrating an example of a 3 cell by 5 cell grid with a title row, a header row, and a header column in accordance with an embodiment of the present invention. The title row 300 contains members "California" 302, "Sales" 304, and "Actual" 306. The header row 308 contains members "100-10" 310, "100-20" 312, "100-30" 314, and "200-20" 316. The header column 318 contains member "Qtr1" 320.

The input method also has a way to represent an active cell range or ranges on which to perform a query operation, and what operation to perform. In an embodiment of the present invention, a rectangular block of cells indicates the cell range on which the query action will be performed. This may be represented as a set of 4 values that represent a starting row, starting column, number of rows, and number of columns. For example, range (0,1,1,1) in the grid of FIG.

3 starts at cell (0,1), which is California, and then spans 1 row and 1 column from there, meaning that the range has only one cell. Range (0,1,1,3) means range has 1 row and 3 columns starting at cell (0,1), so this range would include 3 cells, California, Sales, and Actual. The input method also may provide a way to get the metadata information about the member hierarchy in the database outline of the multidimensional database and an option to specify the basis of splitting the resulting grid.

In an embodiment of the present invention, given a grid and a way to query the metadata about the data source, a second representation of the input grid may be created in the form of two hierarchical tree structures that represent the metadata members present in the input grid and their positional relationships to each other in the input grid (which is different from their relationships to each other in the database outline). One tree may represent the title and header rows and the other tree may represent header columns. For the tree representing title and header rows (hereinafter referred to as the "row tree"), members in the same row are siblings of each other and the members in the next row are children. Each node has the information about its parent, sibling, and/or child. Each node may also have its own row and column count in the grid to identify the cell from which the node was based. Similarly, for the tree representing the header columns (hereinafter referred to as the "column tree"), members in the same column are siblings of each other and the members in the next column are children.

All the extra information in the input grid may be stripped in this process. This may include data cells, alias information, repeated member names. The action cell range may be adjusted for these changes. For each cell, metadata may be used to verify if it is a valid member name or alias, if it is an external text (label) not related to any dimension, or if it is a data cell. All labels may be kept in a third structure with its row and column information. For header columns, if the cell in the previous column has a member-alias relationship with the current column, this constraint may be verified for all header columns and duplicate columns may be neglected while creating the tree. Similarly, repeating member names in header rows may be neglected in creating the row tree.

These trees may then be checked for completeness to ensure that all the basic dimensions are represented in the trees (either directly or through an associated attribute dimension) and any missing dimension may be added (the top member of the dimension hierarchy) at the appropriate place in the row tree.

Figure 4:
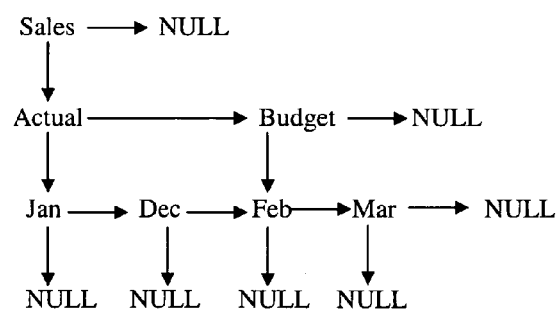
FIG. 4 is a diagram illustrating an example of parsing an input grid into a row tree and a column tree in accordance with an embodiment of the present invention.
Figure 4:
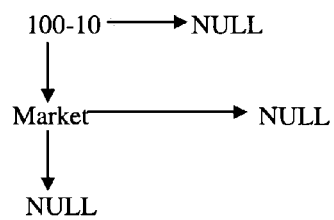

FIG. 4 is a diagram illustrating an example of parsing an input grid into a row tree and a column tree in accordance with an embodiment of the present invention. The input grid 400 may contain header rows 402, 404, 406 and header columns 408, 410. The parsed row tree 412 contains elements from the header rows 402, 404, 406, terminating in NULL nodes representing leaves of the tree. The parsed column tree 414 contains elements from the header columns 408, 410, also terminating in NULL nodes. A horizontal arrow represents a sibling, with a vertical arrow representing a child.

These trees may then be passed to a query processing block to perform the actual query operation such as zoom-in, zoom-out, pivot, keep-only, remove-only, etc. The trees are changed in this process to represent the resulting grid trees. Metadata may be used to perform these operations.

First, the row tree may be traversed in pre-order to see if any of the nodes is in the action range. If a node is found which belongs to the action range, then the related members of that node's member may be queried using metadata and inserted (or deleted) in the tree while maintaining correct relationships in the tree structure. Similarly, the column tree may be processed. The row and column count of the nodes may also be changed to represent these insertions and/or deletions.

Figure 5:
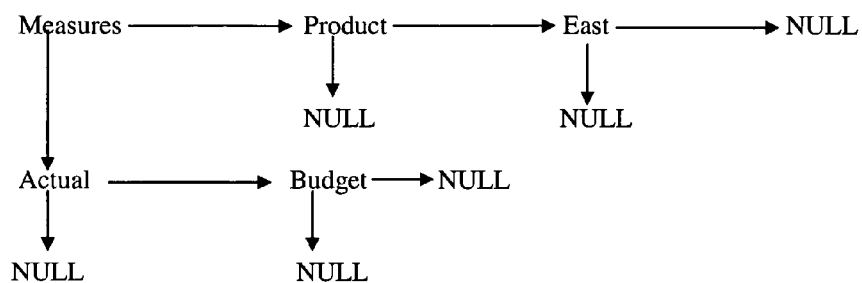
FIG. 5 is a diagram illustrating an example of the processing of row and column trees in accordance with an embodiment of the present invention.
Figure 5:
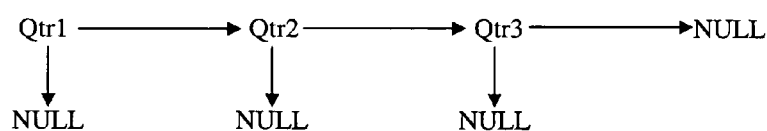

FIG. 5 is a diagram illustrating an example of the processing of row and column trees in accordance with an embodiment of the present invention. The input grid 500 may contain a title row 502 with members Measures 504, Product 506, and East 508. It may also contain a header row 510 with members Actual 512 and Budget 514. It may also contain a column row 516 with members Qtr1 518, Qtr2 520, and Qtr3 522. The members may have the following properties in a database outline that has 5 base dimensions. Measures is a dimension with 3 immediate children: Profit, Inventory, and Ratios. Product is a dimension with 5 immediate children: 100, 200, 300, 400, and Diet. East is a child of Market dimension with New York, Massachusetts, Florida, Connecticut, and New Hampshire as children. Actual and Budget are level 0 members of Scenario dimension so they have no children. Qtr1 is a child of Year dimension and has January, February, and March as immediate children, as does Qtr2 and Qtr3.

It may be further assumed that a zoom-in on product is requested and only to its immediate children. The Zoom-in operation may also take an option specifying the desire to zoom-across (expand across the columns) or zoom-down (expand across the rows). In this example, it may be assumed that zoom-down is selected. The action range may be (0,1,1,1), thus a cell range of one.

A first pass may be made through the input grid checking for any extra information and deleting it, and putting in any information that is missing (e.g., a missing dimensions). The input grid has no repeat labels, and both alias and members are not present in the grid. It also has a representation of all the base dimensions of the outline. Therefore, the grid is satisfactory. If, for example, East was not present in the grid, the base member of this dimension (Market) may be added to the title row. The first row may be identified as a title row and the first data cell as (2,1), which means there are 2 rows in the header rows and 1 column in the header columns.

Now the header rows may be traversed (the first two rows which were identified as header rows in the previous step) and a tree structure identifying the relationships the cell members have to each other in the grid may be created. The row tree 524 is the result of this. Each node may contain information about its original row and column, among other data.

Now, the header columns may be traversed (the first column identified as a header column) and a tree structure identifying the relationships the cell members have to each other in the grid may be created. The column tree 526 is the result of this.

At this point, the operation requested on the action range may be performed. Therefore, the process at this point will depend upon which operation is being requested. Each of several common multidimensional database operations will be described, however, one of ordinary skill in the art will recognize that the invention may be modified to cover any type of multidimensional database operation.

Figure 6:
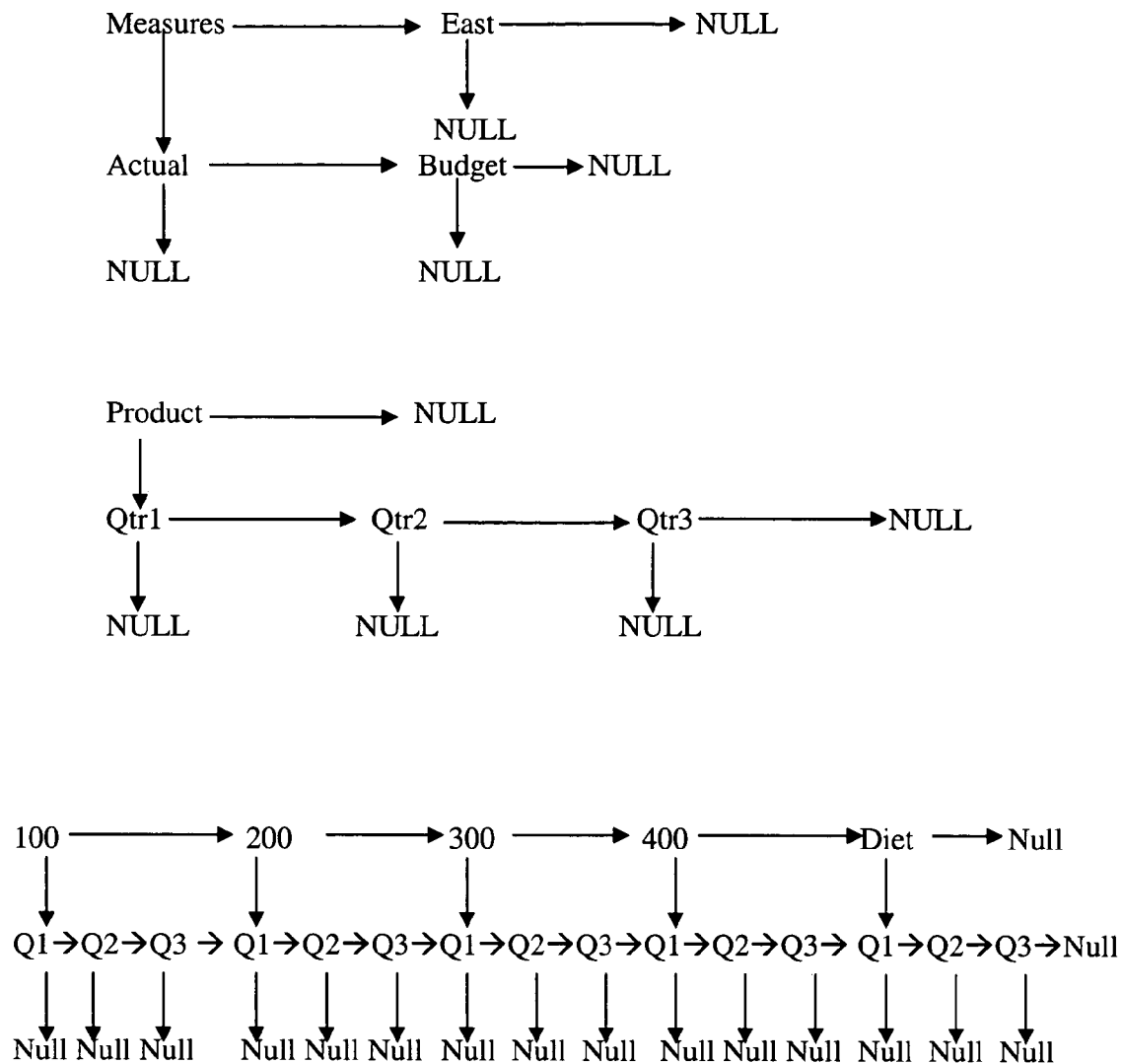
FIG. 6 is a diagram illustrating an example of a row tree and column tree after a zoom-in operation in accordance with an embodiment of the present invention.

For a zoom-in operation, the process starts at the root of the row tree (in this case, Measures), and traverses through identifying which nodes are in the action range. Here, Measures is not in the action range so the process moves to its sibling Product. Product is in the action range. As the zoom-in requested is down, this node may be moved to the column tree and marked as a cell to be zoomed in. FIG. 6 is a diagram illustrating an example of a row tree and column tree after a zoom-in operation in accordance with an embodiment of the present invention. The traversal of the row tree results in the row tree 600 and column tree 602. The new column number of the East node in the row tree changes from 2 to 1. The new column number of the Product node changes to 0, and its row number changes to 2. The new column numbers of Qtr1, Qtr2, and Qtr3 changes to 1. Additionally, the Product node now has Qtr1 as its child. Finally, the Product node is marked for zoom. The rest of the row tree may then be traversed. In this example, there are no other cells in the action range.

The process then starts at the root of the column tree (in this case, Product), and traverses through identifying which nodes are in the action range. Product is in the action range, and is marked for a zoom. At this point, the outline may be queried to get its children, as the operation requested a zoom-in to children level only. There are five children of the Product dimension: 100, 200, 300, 400, and Diet. The subtree of Product may be copied 5 times and the root of the subtree (Qtr1) may be made the child of each of the children of Product that were retrieved from the outline. These children of Product are siblings of each other. The traversal of the column tree results in column tree 604 and row tree 600 remains unchanged. The rest of the column tree may then be traversed. In this example, there are no other cells in the action range.

The split grids may then be created from these resultant tree structures based on the option provided by the user. There could be many different bases for the splitting. Examples include splitting into an approximately equal sized number of queries and splitting based on the number of lines. First, the row tree may be traversed to get the number of columns required by the header rows of the resulting grid. Starting at the root, the maximum number of siblings available at any level in the tree may be counted. Additionally, the number of rows required by the header rows may be counted in the same traversal. This is equal to the number of levels present in the tree. Similarly, the column tree may be traversed to get the maximum number of columns required by the header columns. This is equal to the number of levels present in this tree. The maximum number of siblings at any level in this tree will yield the rows required by the header columns in the resulting grid. These counts represent the size of the resulting grid.

Then, the row tree may be again traversed to create a grid structure referred to as the header row grid. From the total number of rows in the resulting grid, split ranges may be created on the basis of the split. The column tree may then be traversed and multiple grids created based on the number of rows in each split grid. Finally, the header grid may be appended at the top of all these grids to create final split grids.

Continuing the example of FIG. 6, the row tree 600 may be traversed to count the number of siblings at each level. Measures and East are the only siblings at the first level. Then the process may move to the child of Measures, which is Actual. This level also has two siblings (Actual and Budget). Therefore, the number of columns required by header rows is two. A count may also be kept of the number of levels the tree has, which is two. This means that header rows span to 2 columns and 2 rows.

Now moving to the column tree 602, the maximum number of siblings at the first level is 5 (100, 200, 300, 400, and Diet). Then the process moves to the next level, which starts at Qtr1 (child of 100). The maximum number of siblings here is 15; Therefore, the number of rows required by the column tree is 15. Since there are only two levels in this tree, the number of columns required by header columns is 2.

The number of rows and columns in the final grid may then be totaled. The total columns is equal to the number of columns required by header rows (2) added to the number of columns required by header columns (2). Therefore the total is 4. The total rows is equal to the number of rows required by the header rows (2) added to the number of columns required by the header rows (15). Therefore, the total is 17.

The header row grid may then be constructed. This will be a grid of size (2,4). The first two columns are for header columns so they remain blank in this grid. The rest of the columns are filled with the row tree. FIG. 7 is a diagram illustrating an example of a header row grid in accordance with an embodiment of the present invention. The grid 700 will be the top two rows of all the split grids. Only the remaining rows will change from grid to grid.

In this example it may be assumed that the user wanted to split the grids so that there are only 7 rows in each grid. 2 rows will be taken up by header rows, so the column tree needs to be split in chunks of 5 rows each. Starting at the lowest level of the column tree (Qtr1), this makes the second column of the split grids. Its parent, 100, may be put in the first column. Then the process may move to the next sibling of Qtr1, which is Qtr2. This may be put in the next row, second column. The process may then check if it has a parent that is different than the previous sibling's parent, in which case that is put in the first column, otherwise the first column may be left blank. This continues until 5 siblings have been counted. FIG. 8 is a diagram illustrating an example of split grids in accordance with an embodiment of the present invention. The processing of the rows portion of the first split grid 800 has now been completed.

The process then moves to the next sibling of where the first split grid finished. This is Qtr3, and its parent is 200. The process repeats as above, resulting in the second split grid 802. The third split grid 804 may be constructed in a similar fashion.

Figure 9:
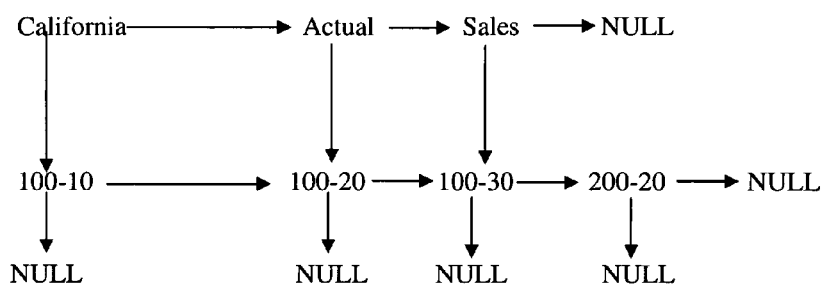
FIG. 9 is a diagram illustrating an example of constructing row and column trees for a keep-only operation in accordance with an embodiment of the present invention.
Figure 9:
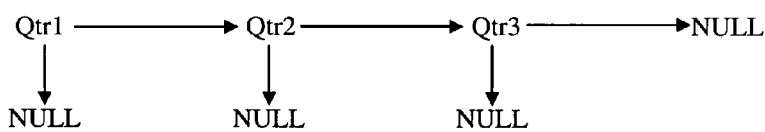
Figure 9:
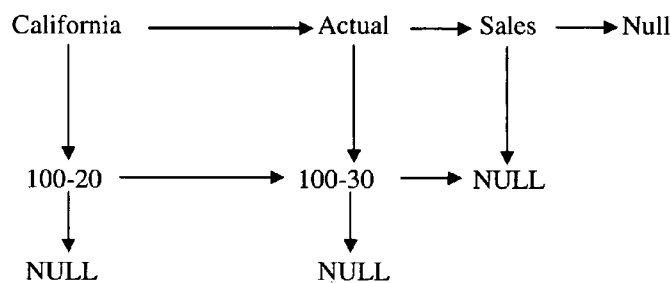

If rather than a zoom-in operation, the operation requested is a keep-only operation, then essentially the user wishes to keep only some of the rows or columns in the grid and remove the rest of the rows or columns. FIG. 9 is a diagram illustrating an example of constructing row and column trees for a keep-only operation in accordance with an embodiment of the present invention. The input grid 900 may define some of the metadata. Additionally, the members may have the following properties in the database outline having 5 base dimensions. Sales may be a leaf member in the Measures dimension. California may be a leaf member in the Market dimension. Actual may be a leaf member in the Market dimension. 100-10, 100-20, and 100-30 may be leaf members in the Product dimension and their parent may be 100. 200-20 may be a leaf member in the Product dimension and its parent may be 200. Qtr1 may be a child of Year dimension and may have January, February, and March as immediate children. Qtr2 and Qtr3 may have similar properties.

Assuming the keep-only operation is to be performed on 100-20 and 100-30, the action range will be a two cell range (1,2,1,2). Any extraneous or missing information may be dealt with in the same way as for the zoom-in operation described earlier. The creation of the tree structures may also be performed in the same way, resulting in row tree 902 and column tree 904. Then, starting at the root of the row tree (California), the tree may be traversed looking for nodes in the action range. California is not, nor are its siblings Actual and Sales. Then the process may move to 100-20, which is in the action range. As it is desired to keep-only these cells, the cell may be marked as keep-only. The next sibling 100-30 may be treated similarly. Then, beginning at the start of that row again, all members not marked as keep only, and the sub-trees below them may be deleted. This results in the subsequent row tree 906.

The column tree may be traversed in the same manner. None of the members here are in the action range. Therefore, the column tree does not change. The resulting trees are in their final form.

Figure 10:
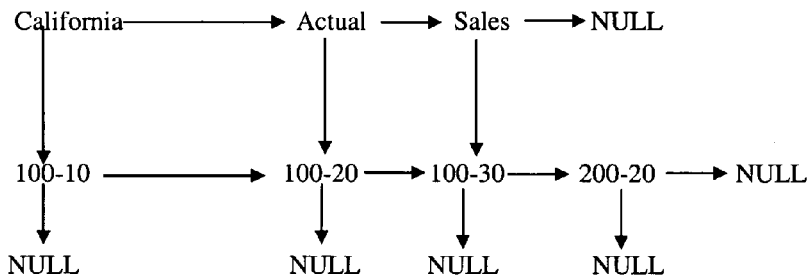
FIG. 10 is a diagram illustrating an example of constructing row and column trees for a pivot operation in accordance with an embodiment of the present invention.
Figure 10:
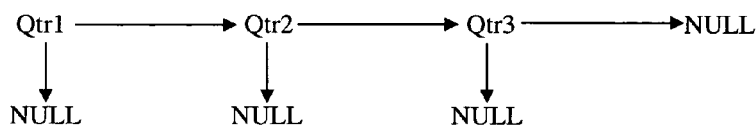
Figure 10:
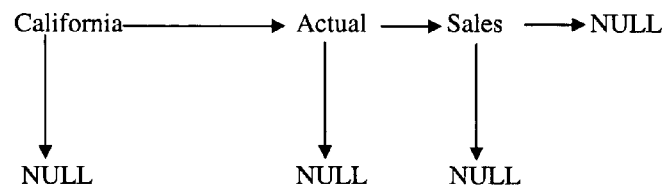
Figure 10:
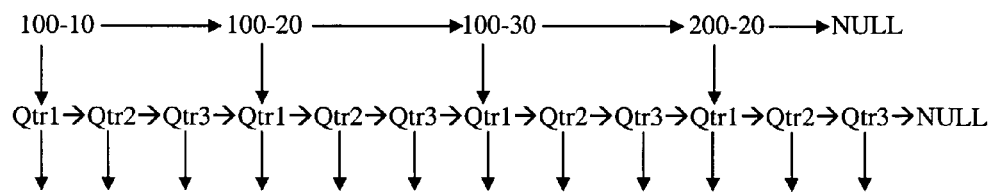

If, rather than a keep-only operation, the operation requested is a pivot operation, then essentially the user wishes to change the position of members from columns to rows and vice versa. FIG. 10 is a diagram illustrating an example of constructing row and column trees for a pivot operation in accordance with an embodiment of the present invention. The input grid 1000 and properties in the database outline may be identical to the keep-only operation example described earlier.

Assuming the pivot operation is to be performed on 100-20, the action range will be a one cell range (1,2,1,1). Once again, any extraneous or missing information may be dealt with in the same way as for the zoom-in operation described earlier. The creation of the tree structures may also be performed in the same way, resulting in row tree 1002 and column tree 1004. Then, starting at the root of the row tree (California), the tree may be traversed to identify any node in the action range. California is not, nor are its siblings Actual and Sales. Moving to the next level, 100-10 is not in the action range, but 100-20 is. As a pivot is desired, and all the members in this row belong to the Product dimension in the database outline, the whole row may be taken to the column tree. If this was a title row, then just that member would be taken to the column tree. The column subtree may be replicated for each of the members added to that tree. This results in subsequent row tree 1006 and subsequent column tree 1008.

The column tree may be traversed in the same manner. None of the members here are in the action range. Therefore, the trees do not change again. The resulting trees are in their final form.

Figure 11:
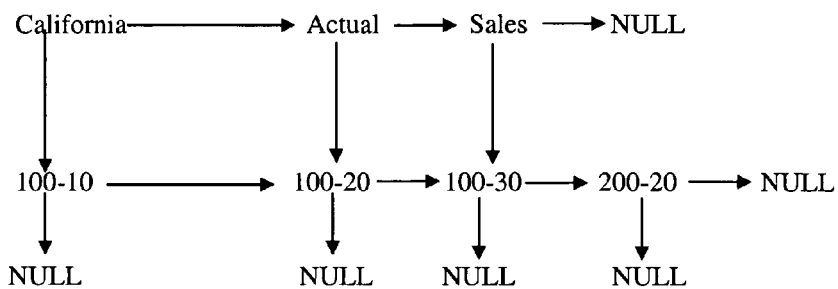
FIG. 11 is a diagram illustrating an example of constructing row and column trees for a remove-only operation in accordance with an embodiment of the present invention.
Figure 11:
Figure 11:
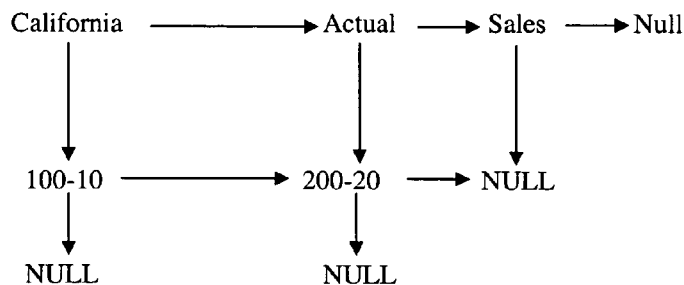

If, rather than a pivot operation, the operation requested is a remove-only operation, then essentially the user wishes to remove only some of the rows or columns in the grid and keep the rest of the rows or columns. FIG. 11 is a diagram illustrating an example of constructing row and column trees for a remove-only operation in accordance with an embodiment of the present invention. The input grid 1100 and properties in the database outline may be identical to the keep-only operation example described earlier.

Assuming the remove-only operation is to be performed on 100-20 and 100-30, the action range will be a two cell range (1,2,1,2). Once again, any extraneous or missing information may be dealt with in the same way as for the zoom-in operation described earlier. The creation of the tree structures may also be performed in the same way, resulting in row tree 1102 and column tree 1104. Then, starting at the root of the row tree (California), the tree may be traversed to identify any node in the action range. California is not, nor are its siblings Actual and Sales. Moving to the next level, 100-10 is not in the action range, but 100-20 is. As a remove-only is desired, this cell may be marked as a remove-only cell. The next sibling, 100-30, also in the action range, may also be marked as remove-only. Then the process may begin at the start of the row again and delete all the members (and sub-trees below them) that are marked as remove-only. This results in subsequent row tree 1106.

The column tree may be traversed in the same manner. None of the members here are in the action range. Therefore, the trees do not change again. The resulting trees are in their final form.

Figure 12:
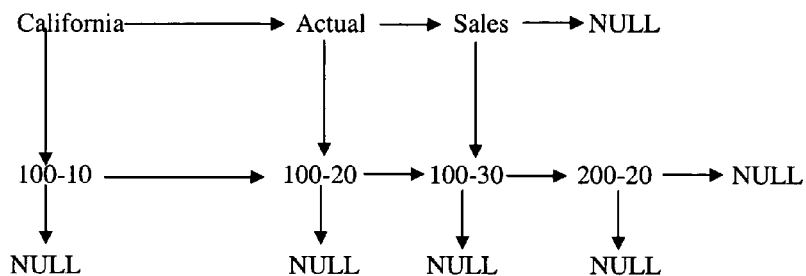
FIG. 12 is a diagram illustrating an example of constructing row and column trees for a zoom-out operation in accordance with an embodiment of the present invention.
Figure 12:
Figure 12:
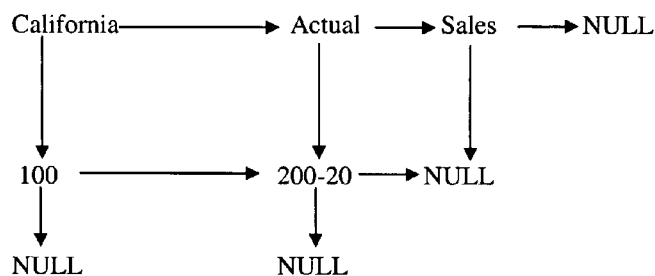

If, rather than a remove-only operation, the operation requested is a zoom-out operation, then the system may proceed as follows. FIG. 12 is a diagram illustrating an example of constructing row and column trees for a zoom-out operation in accordance with an embodiment of the present invention. The input grid 1200 and properties in the database outline may be identical to the keep-only operation example described earlier.

Assuming the zoom-out operation is to be performed on 100-20, the action range will be a one cell range (1,2,1,1). Once again, any extraneous or missing information may be dealt with in the same way as for the zoom-in operation described earlier. The creation of the tree structures may also be performed in the same way, resulting in row tree 1202 and column tree 1204. Then, starting at the root of the row tree (California), the tree may be traversed to identify any node in the action range. California is not, nor are its siblings Actual and Sales. Moving to the next level, 100-10 is not in the action range, but 100-20 is. As a zoom-out is desired, the process will change this and all contiguous members which belong to the same parent in the database outline (e.g., both 100-10 and 100-30 are contiguous members to 100-20 as they are all children of 100 in the database outline) to the parent of this member. This results in subsequent row tree 1206.

The column tree may be traversed in the same manner. None of the members here are in the action range. Therefore, the trees do not change again. The resulting trees are in their final form.

FIG. 13 is a diagram illustrating an example of completed split grids in accordance with an embodiment of the present invention. The header row grid may be appended to each of the grids in FIG. 8 to produce three completed split grids 1300, 1302, 1304.

These grids may then be sent to a data server for data retrieval individually (delayed execution), or they may be sent to multiple data servers (load balancing). If the user requested a complete grid, then it is possible to merge these resultant grids with minimal parsing to generate the whole resultant grid. Grids may be parsed to identify the header rows. This may start by traversing row-wise on the first grid until the first data item is encountered. The rows before this row are header rows and they will be the same for all grids because of the way the grids were split. This may be called the header grid, and may have a corresponding number of rows (HR). The other grids may then be taken one by one in the corresponding order. The first HR rows may then be discarded from each of these grids, and the remainder appended to the end of the first grid. This creates a complete grid as if it was sent to the server without splitting.

FIG. 14 is a diagram illustrating an example of merging resultant grids in accordance with an embodiment of the present invention. Assume two split grids are generated, and data retrieval results in two resultant split grids 1400, 1402, with XXXX indicating data. First the first grid 1400 may be traversed row-wise to find that the first data item is in the third row and third column. That means that the first two rows are the header rows and will be the same for all split grids. So the next grid 1402 may be taken, and all but the first 2 rows may be appended to the end of the first grid 1400, resulting in the final grid 1404.

In an embodiment of the present invention, if the user wishes to see only part of the result, it is possible to only send that grid for data retrieval. For example, the user may wish to see just the first 100 rows of the result. This need not even be expressly specified by the user. It may, for example, be based upon the number of rows that can be displayed on the screen at any one time. If the screen can only display 100 rows, then only enough rows of data to fill the screen need to be retrieved. If the user later scrolls down, a new query command could be sent for the next 100 rows. This may be referred to as client-side cursoring. Additionally, the present invention allows for random cursoring, wherein rather than cursoring the data in order, the data may be cursored in any order. The second 100 rows may be displayed before the first 100 rows, followed by the third 100 rows, for example Furthermore, deferred execution of the queries is possible. If, for example, the system crashes after querying the first 100 rows, it need not requery those rows when the system is restored. Alternatively, if the user just wants to see a subset of the resultset, the rest of the split queries need not be executed at all.

Additionally, the tree structures may be saved by the mid-tier for later use. This can save significant processing time as oftentimes many different users will request the same operation on the same input grid. For example, in a supermarket chain, a drill down to show profitability of each store in the chain may be a common operation requested by many different users. By saving the resulting tree structures generated by the first such query, the processing of subsequent requests may be significantly easier. This may be referred to as named querying.

By performing this grid splitting and grid merging process, the load on the data server may be significantly reduced, as the query operation already has been partially performed on the client and the grid sent to the server is just a retrieval grid to get the data values. Also, the grid sent to and from the server is smaller and may be on an as needed basis, resulting in less network traffic. The split grids may also be sent to replicated data source servers individually for data retrieval, thereby distributing the load among the data servers. All of this conserves memory, which has the additional effect of increasing scalability of the system.

As described above, implementations are possible for grids having more than two axes. For example, in addition to rows and columns, the grids may also be split into chapters and sections.

Additionally, implementations are possible where the query is split on columns instead of rows, or any other basis for splitting requested by the user.

Figure 15:
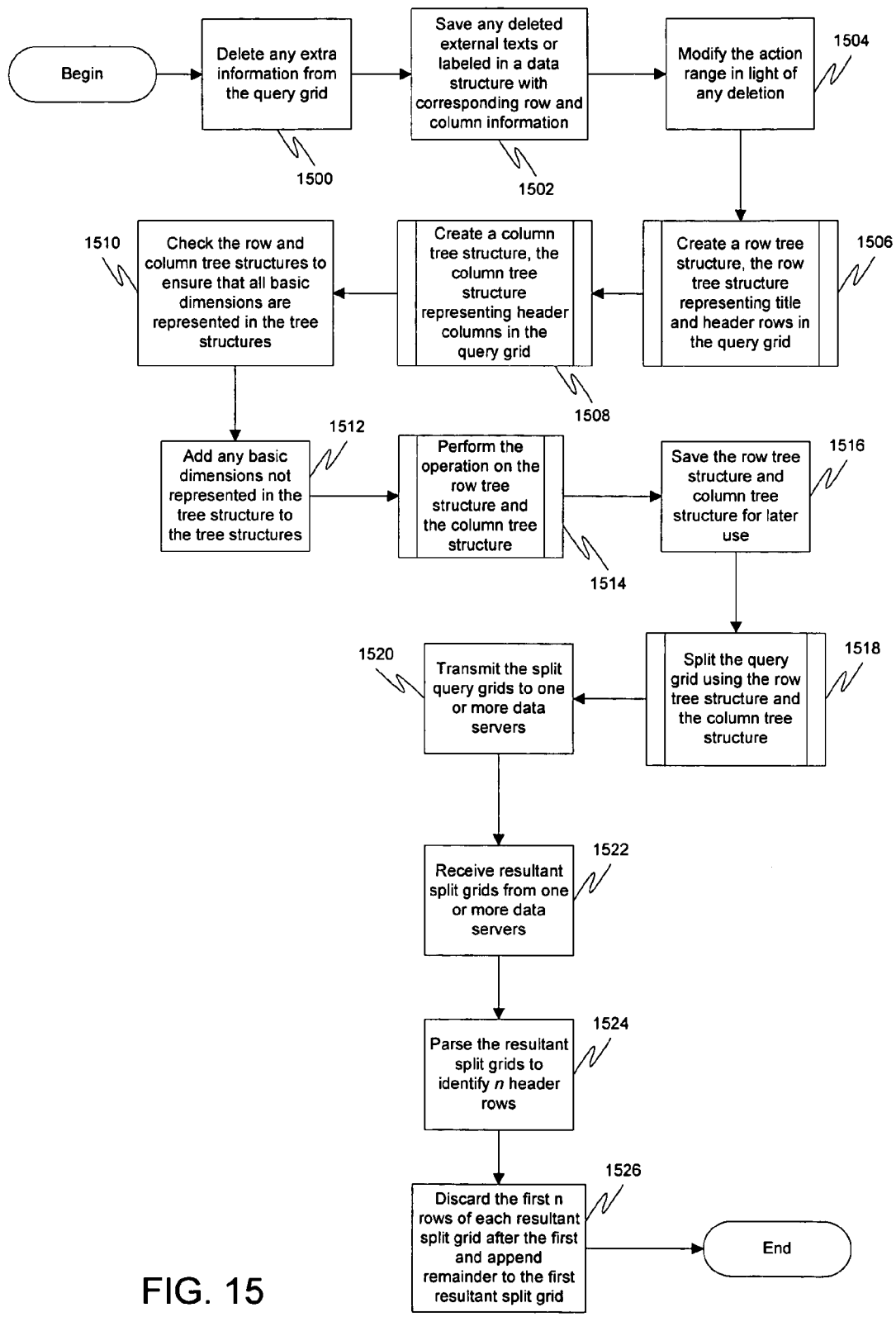
FIG. 15 is a flow diagram illustrating a method for sending a multidimensional database query to one or more data servers in accordance with an embodiment of the present invention.
Figure 16:
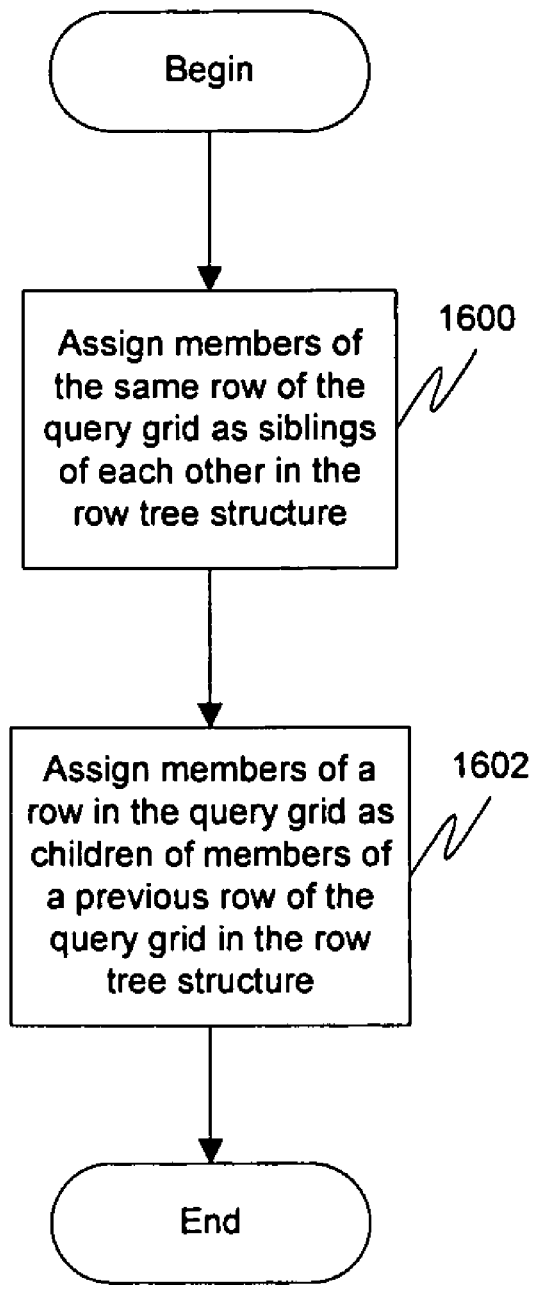
FIG. 16 is a flow diagram illustrating a method for creating a row tree structure in accordance with an embodiment of the present invention.

FIG. 15 is a flow diagram illustrating a method for sending a multidimensional database query to one or more data servers in accordance with an embodiment of the present invention. The multidimensional database query may include a grid having one or more rows and one or more columns, an action range, and an operation. At 1500, any extra information may be deleted from the query grid. This may include, for example, data cells, alias information, repeated member names, and external text or labels. At 1502, any deleted external texts or labels may be saved in a data structure with corresponding row and column information. At 1504, the action range may be modified in light of any deletion. At 1506, a row tree structure may be created, the row tree structure representing title and header rows in the query grid. FIG. 16 illustrates 1506 of FIG. 15 in more detail. FIG. 16 is a flow diagram illustrating a method for creating a row tree structure in accordance with an embodiment of the present invention. At 1600, members of the same row of the query grid may be assigned as siblings of each other in the row tree structure. At 1602, members of a row in the query grid may be assigned as children of members of a previous row of the query grid in the row tree structure. This may include, for each member in a row in the query grid, assigning the member as a child of a closest member in the previous row, wherein if two members in the previous row are equidistant, the closest is the first of the two members. Each of one or more nodes in the row tree structure may contain row and column information regarding a corresponding cell in the query grid.

Figure 17:
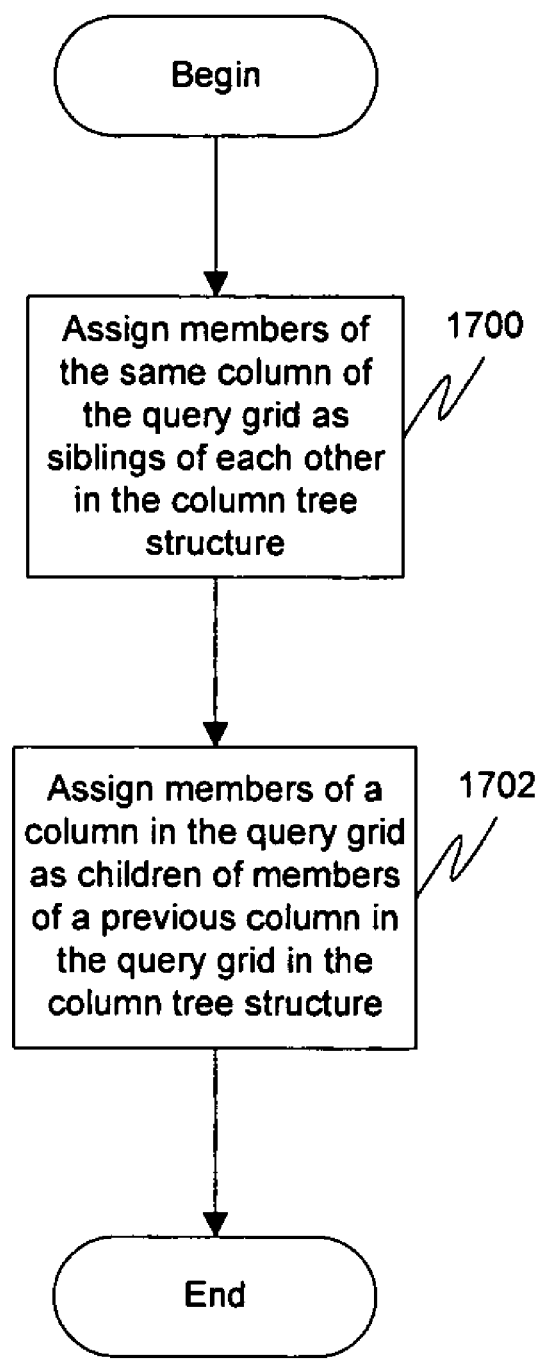
FIG. 17 is a flow diagram illustrating a method for creating a column tree structure in accordance with an embodiment of the present invention.

Referring back to FIG. 15, at 1508 a column tree structure may be created, the column tree structure representing header columns in the query grid. FIG. 17 illustrates 1508 of FIG. 15 in more detail. FIG. 17 is a flow diagram illustrating a method for creating a column tree structure in accordance with an embodiment of the present invention. At 1700, members of the same column of the query grid may be assigned as siblings of each other in the column tree structure. At 1702, members of a column in the query grid may be assigned as children of members of a previous column in the query grid in the column tree structure. This may include, for each member in a column in the query grid, assigning the member as a child of a closest member in the previous column, wherein if two members in the previous column are equidistant, the closest is the first of the two members. Each of one or more nodes in the column tree structure may contain row and column information regarding a corresponding cell in the query grid.

Referring back to FIG. 15, at 1510, the row and column tree structures may be checked to ensure that all the basic dimensions are represented in the tree structures. They may be represented either directly or through an associated attribute dimension. At 1512, any basic dimension not represented in the tree structures may be added to the tree structures.

Figure 18:
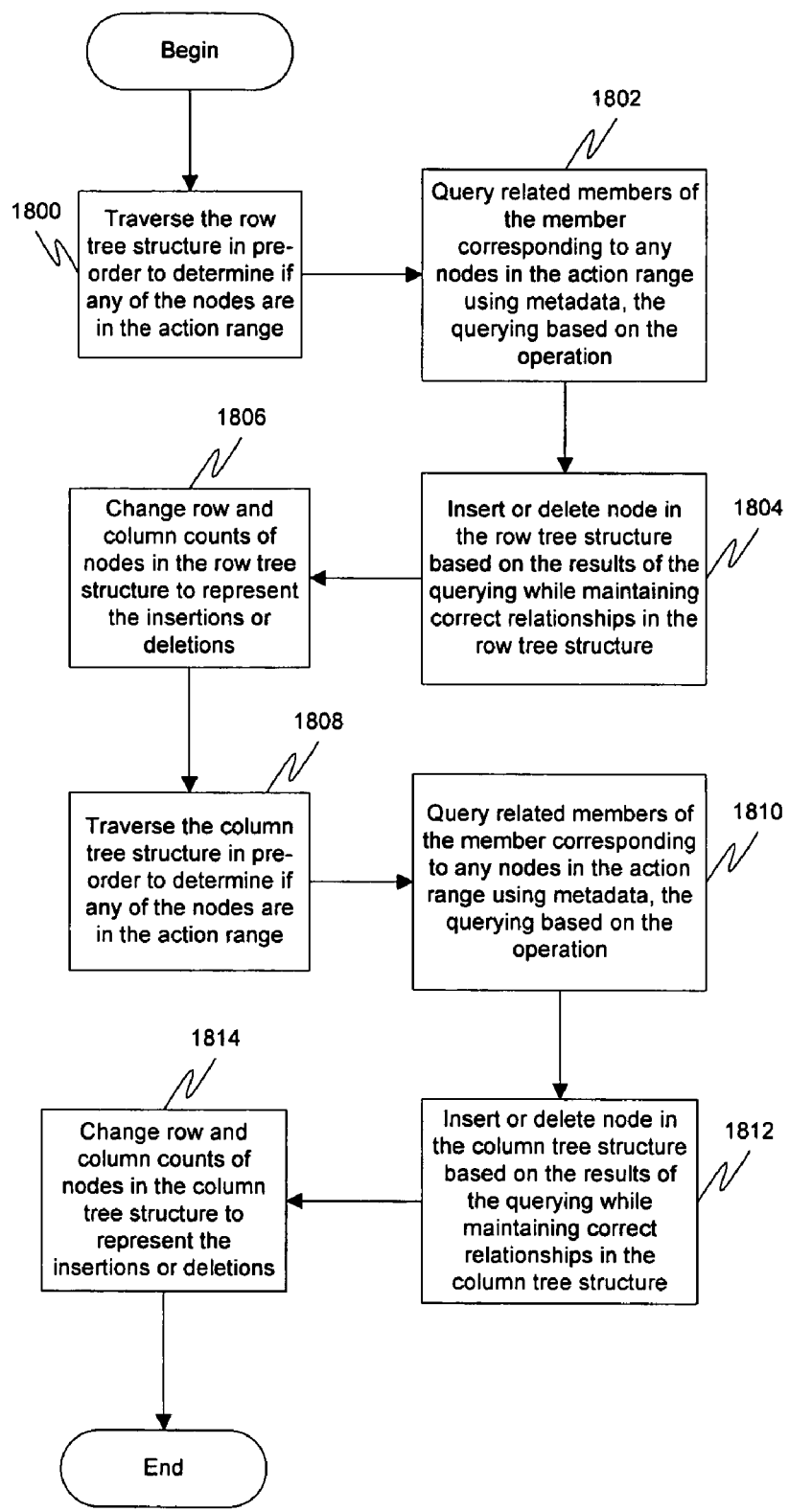
FIG. 18 is a flow diagram illustrating a method for performing an operation on a row tree structure and a column tree structure in accordance with an embodiment of the present invention.

At 1514, the operation may be performed on the row tree structure and the column tree structure. FIG. 18 illustrates 1514 of FIG. 15 in more detail. FIG. 18 is a flow diagram illustrating a method for performing an operation on a row tree structure and a column tree structure in accordance with an embodiment of the present invention. At 1800, the row tree structure may be traversed in pre-order to determine if any of the nodes are in the action range. Then, for each node in the action range, at 1802, related members of the member corresponding to the node may be queried using metadata, the querying based on the operation. Then at 1804, nodes may be inserted or deleted in the row tree structure based on the results of the querying while maintaining correct relationships in the row tree structure. At 1806, row and column counts of nodes in the row tree structure may be changed to represent the insertions and/or deletions. Once the row tree structure has been completely traversed, the process may move to the column tree structure. At 1808, the column tree structure may be traversed in pre-order to determine if any of the nodes are in the action range. Then, for each node in the action range, at 1810, related members of the member corresponding to the node may be queried using metadata, the querying based on the operation. Then at 1812, nodes may be inserted or deleted in the column tree structure based on the results of the querying while maintaining correct relationships in the column tree structure. At 1814, row and column counts of nodes in the column tree structure may be changed to represent the insertions and/or deletions.

Figure 19:
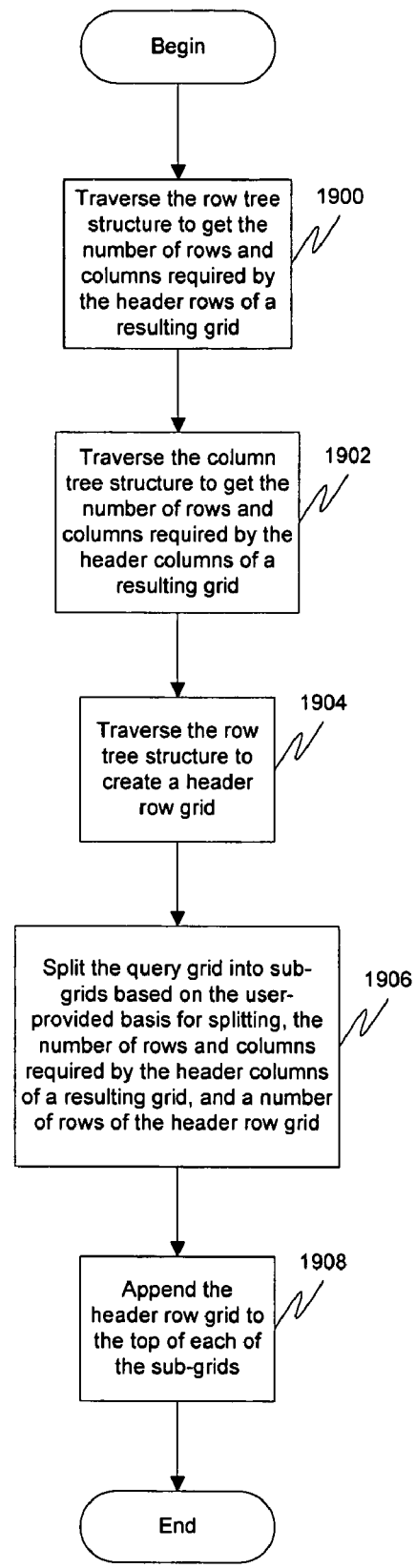
FIG. 19 is a flow diagram illustrating a method for splitting a query tree using a row tree structure and a column tree structure in accordance with an embodiment of the present invention.

Referring back to FIG. 15, at 1516, the row tree structure and column tree structure may be saved for later use. At 1518 the query grid may be split using the row tree structure and the column tree structure. FIG. 19 illustrates 1516 of FIG. 15 in more detail. FIG. 19 is a flow diagram illustrating a method for splitting a query tree using a row tree structure and a column tree structure in accordance with an embodiment of the present invention. The splitting may be based upon a user-provided basis for splitting, which may be, for example, an approximately equal size number of sub-grids based on a fraction provided by a user, a number of lines per sub-grid, or implicit based on the number of lines that can be displayed at one time on a display. At 1900, the row tree structure may be traversed to get the number of rows and columns required by the header rows of a resulting grid. This may include counting a number of siblings available at each level of the row tree structure, counting the number of levels of the row tree structure, assigning the number of rows required by the header rows equal to the number of levels, and assigning the number of columns required by the header rows equal to a maximum number of siblings available at any one level. At 1902, the column tree structure may be traversed to get the number of rows and columns required by the header columns of a resulting grid. This may include counting a number of siblings available at each level of the column tree structure, counting the number of levels of the column tree structure, assigning the number of columns required by the header columns equal to the number of levels, and assigning the number of rows required by the header columns equal to a maximum number of siblings available at any one level.

At 1904, the row tree structure may be traversed to create a header row grid. This may include creating a header row grid of size (number of rows required by the header rows of a resulting grid, number of columns required by the header rows of a resulting grid+number of columns required by the header columns of a resulting grid), and filling columns of the header row grid with members corresponding to nodes in the row tree structure, the filling including ensuring that any columns of the header row grid that would not be filled by members corresponding to nodes in the row tree structure remain blank and begin on the leftmost side of the header row grid.

At 1906, the query grid may be split into sub-grids based on the user-provided basis for splitting, the number of rows and columns required by the header rows of a resulting grid, the number of rows and columns required by the header columns of a resulting grid, and a number of rows of the header row grid. At 1908, the header row grid may be appended to the top of each of the sub-grids.

Referring back to FIG. 15, at 1520, resultant split grids may be received from one or more data servers. At 1522, the split query grids may be transmitted to one or more data servers. This may include, for example, transmitting them to a data server for data retrieval one at a time (delayed execution), or transmitting them to multiple data servers simultaneously for data retrieval (load balancing). At 1524, the resultant split grids may be parsed to identify n header rows. This may include traversing each resultant split grid row-wise until a first data item is encountered, and wherein n is equal to the number of rows traversed until the first data item is encountered. Then at 1526, for each resultant split grid after the first, the first n rows of the resultant split grid may be discarded and the remainder of the resultant split grid may be appended to the first resultant split grid.

Figure 20:
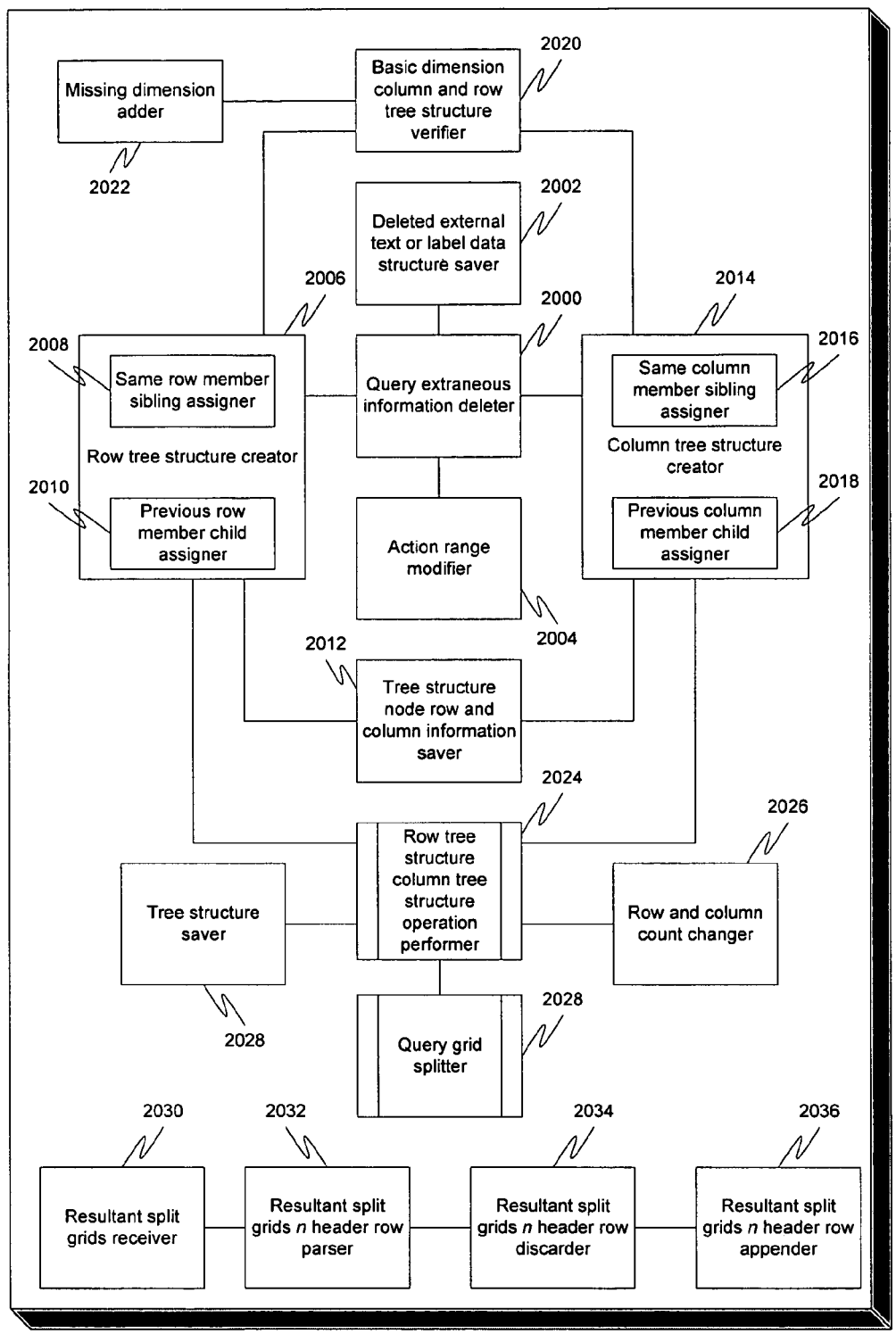
FIG. 20 is a block diagram illustrating an apparatus for sending a multidimensional database query to one or more data servers in accordance with an embodiment of the present invention.

FIG. 20 is a block diagram illustrating an apparatus for sending a multidimensional database query to one or more data servers in accordance with an embodiment of the present invention. The multidimensional database query may include a grid having one or more rows and one or more columns, an action range, and an operation. A query grid extraneous information deleter 2000 may delete any extra information from the query grid. This may include, for example, data cells, alias information, repeated member names, and external text or labels. A deleted external text or label data structure saver 2002 coupled to the query grid extraneous information deleter 2000 may save any deleted external texts or labels in a data structure with corresponding row and column information. An action range modifier 2004 coupled to the query grid extraneous information deleter 2000 may modify the action range in light of any deletion. A row tree structure creator 2006 coupled to the query grid extraneous information deleter 2000 may create a row tree structure, the row tree structure representing title and header rows in the query grid. A same row member sibling assigner 2008 may assign members of the same row of the query grid as siblings of each other in the row tree structure. A previous row member child assigner 2010 may assign members of a row in the query grid may be assigned as children of members of a previous row of the query grid in the tree structure. This may include, for each member in a row in the query grid, assigning the member as a child of a closest member in the previous row, wherein if two members in the previous row are equidistant, the closest is the first of the two members. Each of one or more nodes in the row tree structure may contain row and column information regarding a corresponding cell in the query grid maintained by a tree structure node row and column information saver 2012 coupled to the row tree structure creator 2006.

A column tree structure creator 2014 coupled to the query grid extraneous information deleter 2000 may create a column tree structure, the column tree structure representing header columns in the query grid. A same column row member sibling assigner 2016 may assign members of the same column of the query grid as siblings of each other in the column tree structure. A previous column member child assigner 2018 may assign members of a column in the query grid as children of members of a previous column in the query grid in the tree structure. This may include, for each member in a column in the query grid, assigning the member as a child of a closest member in the previous column, wherein if two members in the previous column are equidistant, the closest is the first of the two members. Each of one or more nodes in the column tree structure may contain row and column information regarding a corresponding cell in the query grid maintained by the tree structure node row and column information receiver 2012 coupled to the column tree structure creator 2014.

A basic dimension column and row tree structure verifier 2020 coupled to the row tree structure creator 2006 and to the column tree structure creator 2014 may check the rows and column trees to ensure that all the basic dimensions are represented in the trees. They may be represented either directly or through an associated attribute dimension. A missing dimension adder 2022 coupled to the basic dimension column and row tree structure verifier 2020 may add any basic dimension not represented in the trees.

Figure 21:
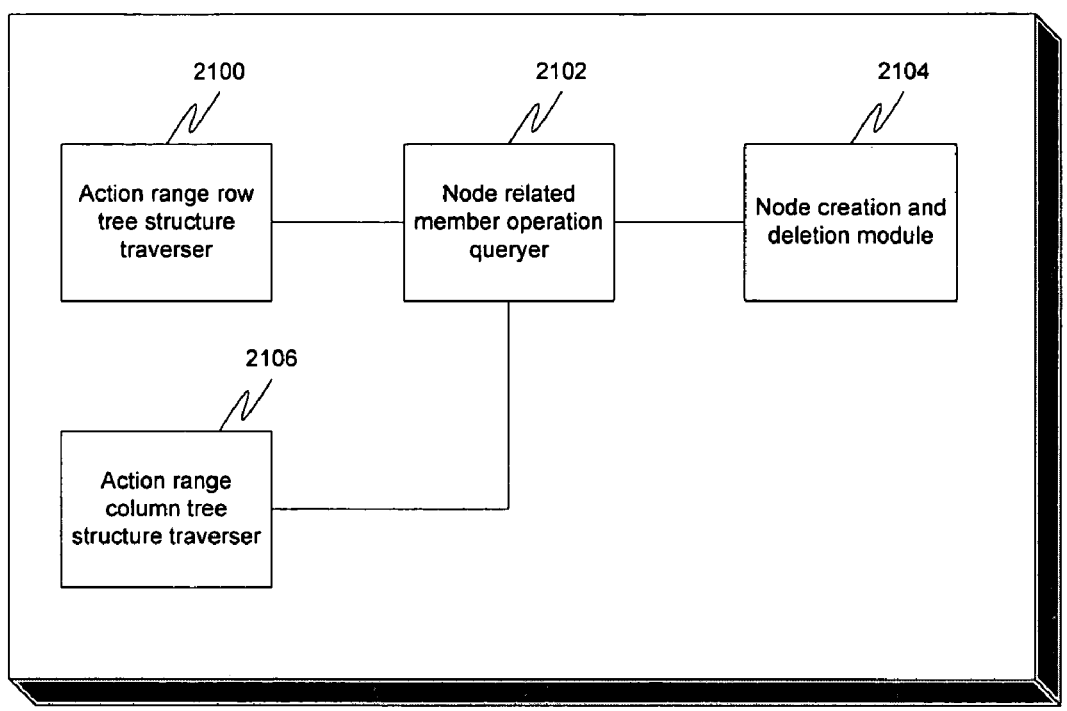
FIG. 21 is a block diagram illustrating a row tree structure column tree structure operation performer in accordance with an embodiment of the present invention.

A row tree structure column tree structure operation performer 2024 coupled to the row tree structure creator 1606 and to the column tree structure creator 2014 may perform the operation on the row tree structure and the column tree structure. FIG. 21 illustrates 2024 of FIG. 20 in more detail. FIG. 21 is a block diagram illustrating a row tree structure column tree structure operation performer in accordance with an embodiment of the present invention. An action range row tree structure traverser 2100 may traverse the row tree structure in pre-order to determine if any of the nodes is in the action range. Then, for each node in the action range, a node related member operation queryer 2102 coupled to the action range row tree structure traverser 2100 may query related members of the member corresponding to the node using metadata, the querying based on the operation. A node creation and deletion module 2104 coupled to the node related member operation queryer 2102 may insert or delete nodes in the row tree structure based on the results of the querying while maintaining correct relationships in the row tree structure. Referring back to FIG. 20, a row and column count changer 2026 coupled to the row tree structure column tree structure operation performer 2024 may change row and column counts of nodes in the row tree structure to represent the insertions and/or deletions. Once the row tree structure has been completely traversed, the process may move to the column tree structure. Referring back to FIG. 21, an action range column tree structure traverser 2108 may traverse the column tree structure in pre-order to determine if any of the nodes is in the action range. Then, for each node in the action range, the node related member operation queryer 2102 coupled to the action range column tree structure traverser 2106 may query related members of the member corresponding to the node using metadata, the querying based on the operation. Then the node creation and deletion module 2106 may inset or delete nodes in the column tree structure based on the results of the querying while maintaining correct relationships in the column tree structure. Referring back to FIG. 20, the row and column count changer 2026 may change row and column counts of nodes in the column tree structure to represent the insertions and/or deletions.

Figure 22:
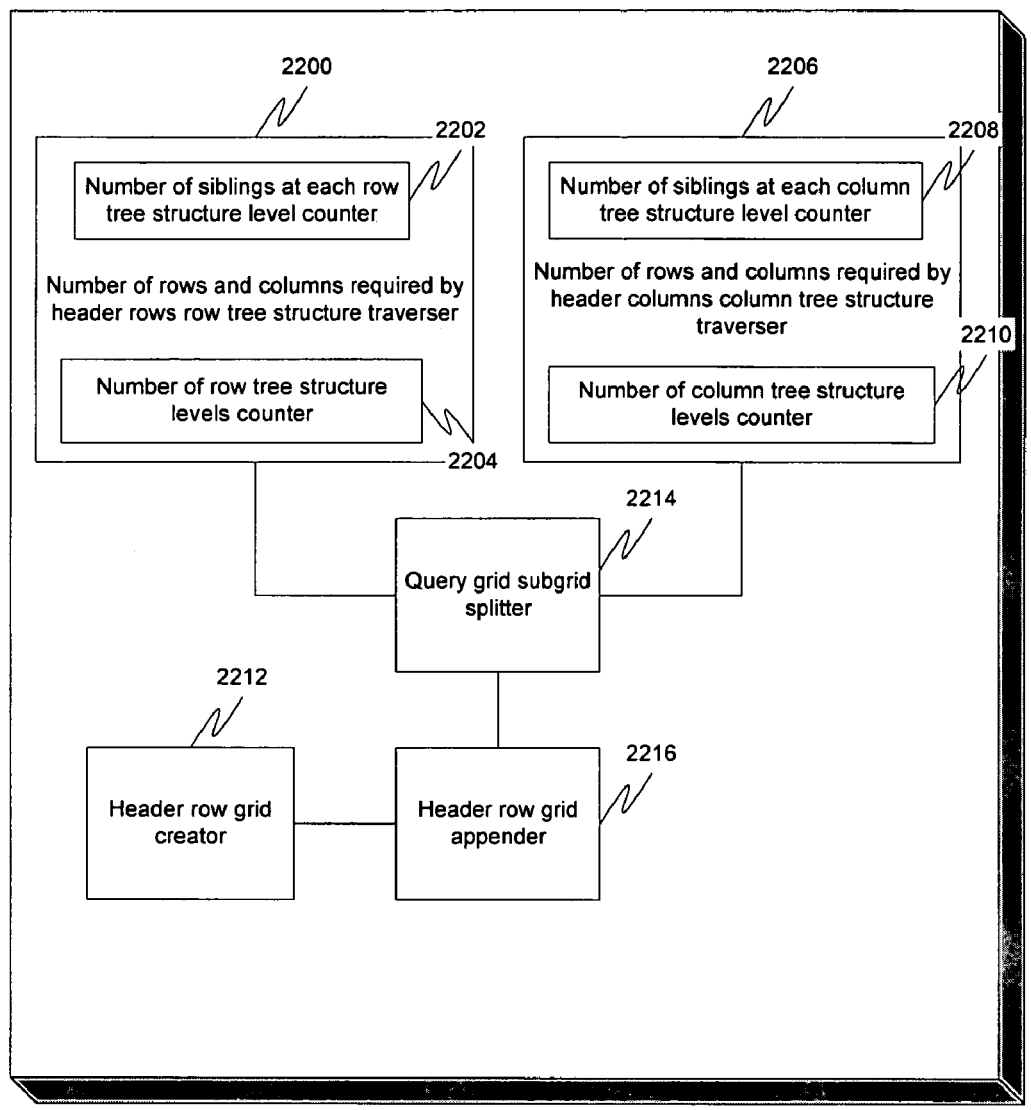
FIG. 22 is a block diagram illustrating a query grid splitter in accordance with an embodiment of the present invention.

A tree structure saver 2028 coupled to the row tree structure column tree structure operation performer 2024 may save the row tree structure and column tree structure for later use. A query grid splitter 2030 coupled to the row tree structure column tree structure operation performer 2024 may split the query grid using the row tree structure and the column tree structure. FIG. 22 illustrates 2030 of FIG. 20 in more detail. FIG. 22 is a block diagram illustrating a query grid splitter in accordance with an embodiment of the present invention. The splitting may be based upon a user-provided basis for splitting, which may be, for example, an approximately equal size number of sub-grids based on a fraction provided by a user, a number of lines per sub-grid, or implicit based on the number of lines that can be displayed at one time on a display. A number of rows and columns required by header rows row tree structure traverser 2200 may traverse the row tree structure to get the number of rows and columns required by the header rows of a resulting grid. This may include counting a number of siblings available at each level of the row tree structure using a number of siblings at each row tree structure level counter 2202, counting the number of levels of the row tree structure using a number of row tree structure levels counter 2204, assigning the number of rows required by the header rows equal to the number of levels, and assigning the number of columns required by the header rows equal to a maximum number of siblings available at any one level. A number of rows and columns required by header columns column tree structure traverser 2206 may traverse the column tree structure to get the number of rows and columns required by the header columns of a resulting grid. This may include counting a number of siblings available at each level of the column tree structure using a number of siblings at each column tree structure level counter 2208, counting the number of levels of the column tree structure using a number of column tree structure levels counter 2210, assigning the number of columns required by the header columns equal to the number of levels, and assigning the number of rows required by the header columns equal to a maximum number of siblings available at any one level.

A header row grid creator 2212 may traverse the tree structure to create a header row grid. This may include creating a header row grid of size (number of rows required by the header rows of a resulting grid, number of columns required by the header rows of a resulting grid+number of columns required by the header columns of a resulting grid), and filling columns of the header row grid with members corresponding to nodes in the row tree structure, the filling including ensuring that any columns of the header row grid that would not be filled by members corresponding to nodes in the row tree structure remain blank and begin on the leftmost side of the header row grid.

A query grid subgrid splitter 2214 coupled to the number of rows required by header rows row tree structure traverser 2200 and to the number of rows and columns required by header columns column tree structure traverser 2206 may split the query grid into sub-grids based on the user-provided basis for splitting, the number of rows and columns required by the header rows of a resulting grid, the number of rows and columns required by the header columns of a resulting grid, and a number of rows of the header row grid. A header row grid appender 2216 coupled to the query grid subgrid splitter 2214 and to the header row grid creator 2212 may append the header row grid to the top of each of the sub-grids.

Referring back to FIG. 20, the split query grids may be transmitted to one or more data servers. This may include, for example, transmitting them to a data server for data retrieval one at a time (delayed execution), or transmitting them to multiple data servers simultaneously for data retrieval (load balancing). A resultant split grids receiver 2032 may receive resultant split grids from one or more data servers. A resultant split grids n header row parser 2034 coupled to the resultant split grids receiver 2032 may parse the resultant split grids to identify n header rows. This may include traversing each resultant split grid row-wise until a first data item is encountered, and wherein n is equal to the number of rows traversed until the first data item is encountered. Then a resultant split grids n header row discarder 2036 coupled to the resultant split grids n header row parser 2034 may, for each resultant split grid after the first, discard the first n rows of the resultant split grid and a resultant split grids n header row appender 2038 coupled to the resultant split grids n header row discarder 2036 may append the remainder of the resultant split grid may be appended to the first resultant split grid.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for sending a multidimensional database query to one or more data servers, the multidimensional database query including a grid having one or more rows and one or more columns, an action range, and an operation, the method comprising:

creating a row tree structure, said row tree structure representing title and header rows in the query grid;

creating a column tree structure, said column tree structure representing header columns in the query grid;

performing the operation on the row tree structure and the column tree structure;

splitting the query grid into two or more split query grids using the row tree structure and the column tree structure, wherein each split query grid represents a portion of the database query;

transmitting the split query grids to the one or more data servers;

parsing the two or more split query grids to identify n header rows;

discarding the first n rows of each parsed split query grid subsequent to a first parsed split query grid to obtain one or more resultant split query grids, where n is the number of rows traversed until a first data item is encountered; and appending each resultant split query grid to the first parsed split query grid.

2. The method of claim 1, wherein said creating a row tree structure includes assigning members of the same row of the query grid as siblings of each other in the row tree structure.

3. The method of claim 2, wherein said creating a row tree structure further includes assigning members of a row in the query grid as children of members of a previous row in the query grid in the tree structure.

4. The method of claim 3, wherein said assigning members of a row in the query grid as children includes, for each member in a row in the query grid:

determining a distance between a member of a row in the query grid and members of a previous row in the query grid;

assigning said member as a child of a closest member in said previous row; and wherein if two members in said previous row are equidistant to said member, said closest member is the first of said two members.

5. The method of claim 1, wherein each of one or more nodes in said row tree structure contains row and column information regarding a corresponding cell in the query grid.

6. The method of claim 1, wherein said creating a column tree structure includes assigning members of the same column of the query grid as siblings of each other in the column tree structure.

7. The method of claim 6, wherein said creating a column tree structure further includes assigning members of a column in the query grid as children of members of a previous column in the query grid in the tree structure.

8. The method of claim 7, wherein said assigning members of a column in the query grid as children includes, for each member in a column in the query grid:

determining a distance between a member of a column in the query grid and members of a previous column in the query grid;

assigning said member as a child of a closest member in said previous column; and wherein if two members in said previous column are equidistant to said member, said closest member is the first of said two members.

9. The method of claim 1, wherein each of one or more nodes in said column tree structure contains row and column information regarding a corresponding cell in the query grid.

10. The method of claim 1, further comprising deleting at least a portion of the information from the query grid that is not row and column information of each node or information about a parent, sibling, or child of each node.

11. The method of claim 10, wherein said at least a portion of the information includes information selected from the group consisting of data cells, alias information, repeated member names, external text, and external labels.

12. The method of claim 10, further comprising modifying the action range in light of said deletion.

13. The method of claim 11, wherein deleted external texts or deleted external labels are saved in a data structure with corresponding row and column information.

14. The method of claim 1, further comprising checking the row and column trees to ensure one or more basic dimensions of each node in the row and column trees are represented in the trees.

15. The method of claim 14, wherein dimensions may be represented in the trees directly or through an associated attribute dimension.

16. The method of claim 14, further comprising adding any basic dimensions to the trees that are not represented in the trees.

17. The method of claim 1, wherein said performing the operation includes:

traversing said row tree structure in pre-order to determine if any of the nodes is in the action range;

for each node in the action range:

querying related members of the member corresponding to the node using metadata, said querying based on the operation; and inserting or deleting nodes of said row tree structure based on results of said querying while maintaining correct relationships in the row tree structure.

18. The method of claim 17, wherein said performing the operation further includes:

traversing said column tree structure in pre-order to determine if any of the nodes is in the action range;

for each node in the action range:

querying related members of the member corresponding to the node using metadata, said querying based on the operation; and inserting or deleting nodes of said column tree structure based on results of said querying while maintaining correct relationships in the column tree structure.

19. The method of claim 1, wherein said splitting the query grid includes splitting the query grid based upon a user-provided basis for splitting.

20. The method of claim 1, further comprising:

transmitting said split query grids to a data server for data retrieval one at a time.

21. The method of claim 1, further comprising:

transmitting said split query grids to multiple data servers simultaneously for data retrieval.

22. An apparatus for sending a multidimensional database query to one or more data servers, the multidimensional database query including a grid having one or more rows and one or more columns, an action range, and an operation, the apparatus comprising:

means for creating a row tree structure, said row tree structure representing title and header rows in the query grid;

means for creating a column tree structure, said column tree structure representing header columns in the query grid;

means for performing the operation on the row tree structure and the column tree structure;

means for splitting the query grid into two or more split query grids using the row tree structure and the column tree structure; and means for transmitting the split query grids to the one or more data servers, wherein each split query grid represents a portion of the database query;

means for parsing the two or more split query grids to identify n header rows;

means for discarding the first n rows of each parsed split query grid subsequent to a first parsed split query grid to obtain one or more resultant split query grids, where n is the number of rows traversed until a first data item is encountered; and means for appending each resultant split query grid to the first parsed split query grid.

23. The apparatus of claim 22, wherein said creating a row tree structure includes assigning members of the same row of the query grid as siblings of each other in the row tree structure.

24. The apparatus of claim 23, wherein said creating a row tree structure further includes assigning members of a row in the query grid as children of members of a previous row in the query grid in the tree structure.

25. The apparatus of claim 24, wherein said assigning members of a row in the query grid as children includes, for each member in a row in the query grid:

determining a distance between a member of a row in the query grid and members of a previous row in the query grid;

assigning said member as a child of a closest member in said previous row; and wherein if two members in said previous row are equidistant to said member, said closest member is the first of said two members.

26. The apparatus of claim 22, wherein each of one or more nodes in said row tree structure contains row and column information regarding a corresponding cell in the query grid.

27. The apparatus of claim 22, wherein said creating a column tree structure includes assigning members of the same column of the query grid as siblings of each other in the column tree structure.

28. The apparatus of claim 27, wherein said creating a column tree structure further includes assigning members of a column in the query grid as children of members of a previous column in the query grid in the tree structure.

29. The apparatus of claim 28, wherein said assigning members of a column in the query grid as children includes, for each member in a column in the query grid:
   determining a distance between a member of a column in the query grid and members of a previous column in the query grid;
   assigning said member as a child of a closest member in said previous column; and
   wherein if two members in said previous column are equidistant to said member, said closest member is the first of said two members.

30. The apparatus of claim 22, wherein each of one or more nodes in said column tree structure contains row and column information regarding a corresponding cell in the query grid.

31. The apparatus of claim 22, further comprising deleting at least a portion of the information from the query grid that is not row and column information of each node or information about a parent, sibling, or child of each node.

32. The apparatus of claim 31, wherein said at least a portion of the information includes information selected from the group consisting of data cells, alias information, repeated member names, external text, and external labels.

33. The apparatus of claim 31, further comprising modifying the action range in light of said deletion.

34. The apparatus of claim 32, wherein deleted external texts or deleted external labels are saved in a data structure with corresponding row and column information.

35. The apparatus of claim 22, further comprising checking the row and column trees to ensure one or more basic dimensions of each node in the row and column trees are represented in the trees.

36. The apparatus of claim 35, wherein dimensions may be represented in the trees directly or through an associated attribute dimension.

37. The apparatus of claim 35, further comprising adding any basic dimensions to the trees that are not represented in the trees.

38. The apparatus of claim 22, wherein said performing the operation includes:
   traversing said row tree structure in pre-order to determine if any of the nodes is in the action range;
   for each node in the action range:
      querying related members of the member corresponding to the node using metadata, said querying based on the operation; and
      inserting or deleting nodes of said row tree structure based on results of said querying while maintaining correct relationships in the row tree structure.

39. The apparatus of claim 38, wherein said performing the operation further includes:
   traversing said column tree structure in pre-order to determine if any of the nodes is in the action range;
   for each node in the action range:
      querying related members of the member corresponding to the node using metadata, said querying based on the operation; and
      inserting or deleting nodes of said column tree structure based on results of said querying while maintaining correct relationships in the column tree structure.

40. The apparatus of claim 22, wherein said splitting the query grid includes splitting the query grid based upon a user-provided basis for splitting.

41. The apparatus of claim 22, further comprising:
   means for transmitting said split query grids to a data server for data retrieval one at a time.

42. The apparatus of claim 22, further comprising:
   means for transmitting said split query grids to multiple data servers simultaneously for data retrieval.

* * * * *